Jan. 12, 1932.  C. H. LEINERT  1,840,629
VALVE
Filed April 27, 1927
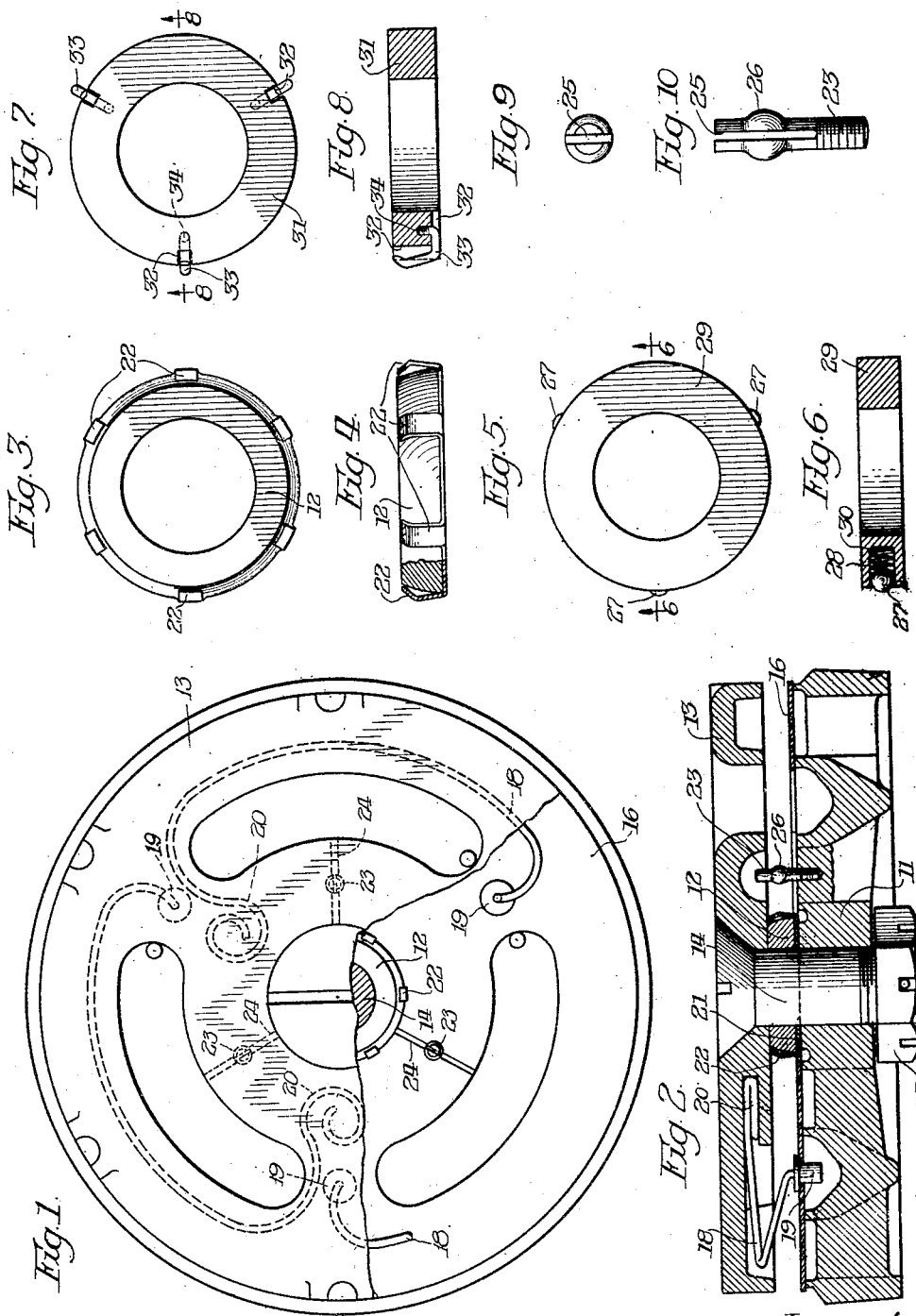
Inventor
Charles H. Leinert
By Wilkinson, Husley, Byrn & Knight
Attys
Witness:
A. Burkhardt Patented Jan. 12, 1932

1,840,629

UNITED STATES PATENT OFFICE

CHARLES H. LEINERT, OF CHICAGO, ILLINOIS, ASSIGNOR TO LEINERT VALVE COMPANY, OF CHICAGO, ILLINOIS, A CORPORATION OF ILLINOIS

VALVE

Application filed April 27, 1927. Serial No. 187,011.

This invention relates to a new and improved valve construction and more particularly to a structure for use with valves of the types designed for use with blower engines or air compressors or the like.

Valves in engines of this type are operated at comparatively high speed and are light in structure and provided with light springs so as to operate freely and rapidly and without undue jar or wear. A difficulty with such valves lies in the fact that they tend to flutter or chatter. This chattering occurs due to variations in air pressure and speed of stroke and results in considerable wear to the valve. It also results in considerable loss of efficiency in properly passing the air or controlling its passage.

It is an object of the present invention to provide means for preventing chattering of valves of this character.

It is a further object to provide means adapted both to positively seat the valve and to maintain it positively away from its seat during the proper portions of the cycle of piston movement.

It is an additional object to provide a construction which is simple in design, cheap in structure and which may be readily adapted to existing piston and valve structures.

Other and further objects will appear as the description proceeds.

I have illustrated certain preferred embodiments of my invention in the accompanying drawings, in which Figure 1 is a plan view partly broken away showing an abutment member and associated valve structure;

Figure 2 is a transverse section of Figure 1;

Figure 3 is a plan view showing the central spring structure on an enlarged scale;

Figure 4 is a side elevation of Figure 3 partly broken away;

Figure 5 is a view similar to Figure 3 showing a modified form of construction;

Figure 6 is a transverse section of Figure 5 taken on line 6—6 of Figure 5;

Figure 7 is a view similar to Figure 3 showing a further modification;

Figure 8 is a section taken on line 8—8 of Figure 7;

Figure 9 is a plan view of one of the spring studs; and

Figure 10 is a side elevation of the stud of Figure 9.

In the form of construction shown the valve structure comprises the valve seat member 11, the spacing member or collar 12, the abutment member 13 and the bolt 14, which carries the nut 15 holding the parts together. The valve member 16 is a thin sheet of metal cut to the form shown. The valve member 16 is held down against the seat 11 by springs 18 which have their lower ends seated in socket members 19 in the valve member and their upper ends seated at 20 in recesses in the abutment member 13. It will be understood that the valve in operation reciprocates from the position in which it is shown in Figure 2 to a position against the abutment member 13.

The spring member 21 is held between the collar 12 and the valve seat member 11. This spring is provided with a plurality of upwardly extending fingers 22 which incline outwardly and have their upper ends turned inwardly. The spring studs 23 are screwed into the valve member, as shown in Figure 2, and as best shown in Figure 1, are located in the radially extending slots 24 in the valve plate 16. These studs are formed with transverse slots 25 extending down into them and have the lateral bulges 26 formed on their sides intermediate their ends. They are threaded into the valve seat member.

The modified form of structure shown in Figures 5 and 6 consists in a plurality of balls 27 seated in radial sockets 28 in a ring 29. The springs 30 urge the balls outwardly and it will be understood that the adjacent edges of the sockets are upset slightly to keep the balls in position after they are once inserted.

The form of construction shown in Figures 7 and 8 comprises a ring 31 having cutaway notches 32 which extend to the lower face of the ring, as shown in Figure 8. The spring fingers 33 have their upturned ends 34 seated in the ring. These fingers extend upwardly and outwardly and have their upper ends turned inwardly in a manner similar to the spring fingers 22 of Figures 3 and 4.

In the operation of the device, the valve 16 moves away from the valve seat member 11 against the abutment member 13, this movement being caused by the rush of the fluid against the valve plate through the valve openings which rush of fluid overcomes the resistance of the springs 18. This movement of the valve plate also overcomes the resistance of the spring fingers 22 and as the valve reaches its position against the abutment, it is held there against the shoulder formed by the inturned ends of the spring fingers 22. It will be understood that these fingers are pressed inwardly slightly during the movement of the valve plate and spring outwardly as soon as the valve reaches its limit of movement. Similarly, this movement causes the valve to engage the enlargements 26 on the studs 23, springing the sides of the studs inwardly to partially close the slot 25. As the valve passes the enlargements 26 the halves of the studs spring apart and the valve plate is yieldingly held above the enlargements.

In the form of construction shown in Figures 5 and 6, the movement of the valve plate will cause the balls 27 to be pressed inwardly against the resistance of the spring 30 and these balls will spring out as the plate passes beyond them and thus retain the plate in its position against the abutment member. The spring fingers of Figures 7 and 8 function in a manner identical with the spring fingers 22 of Figures 3 and 4. It will be apparent that the spring or spring pressed balls will yieldingly retain the valve plate at either of its limits of movement. This will thus prevent chattering whether the valve plate is seated against the valve member or against the abutment member. The springs 18 are of such strength as to normally return the valve 16 to its seat against the resistance of the anti-chattering means when there is no fluid pressure against the valve.

It will be understood that the studs 23 may be used alone or with any of the other forms of the device, and that the other forms of the device may be used with or without the studs. While I have shown certain preferred embodiments of my invention, it will be understood that it is capable of further modifications and I contemplate such variations and changes as come within the spirit and scope of the appended claims.

I claim:

1. In a valve for blowers or the like, the combination of a valve seat, a valve abutment member, a valve plate movable between the valve seat and valve abutment member, and resilient members adapted to engage the valve yieldingly to retain it at either limit of movement.

2. In a valve for blowers or the like, the combination of a valve seat, a valve abutment member, a valve plate, spring means normally seating the valve, and spring members adapted to engage the valve yieldingly to retain it against either the valve seat member or abutment member, said spring means being of a strength to overcome the yielding spring members and seat the valve.

3. In a valve for blowers or the like, the combination of a valve seat, a valve abutment member, a valve plate, and spring members engaging an edge of the valve plate, said members having portions in angular relation to each other adapted to engage the valve plate at its limits of movement.

Signed at Chicago, Illinois, this 22nd day of April, 1927.

CHARLES H. LEINERT.